Feb. 28, 1950
H. B. HALL
2,499,095
FURROW OPENING ATTACHMENT FOR GRAIN DRILLS OR PLANTERS
Filed April 21, 1947
2 Sheets-Sheet 1
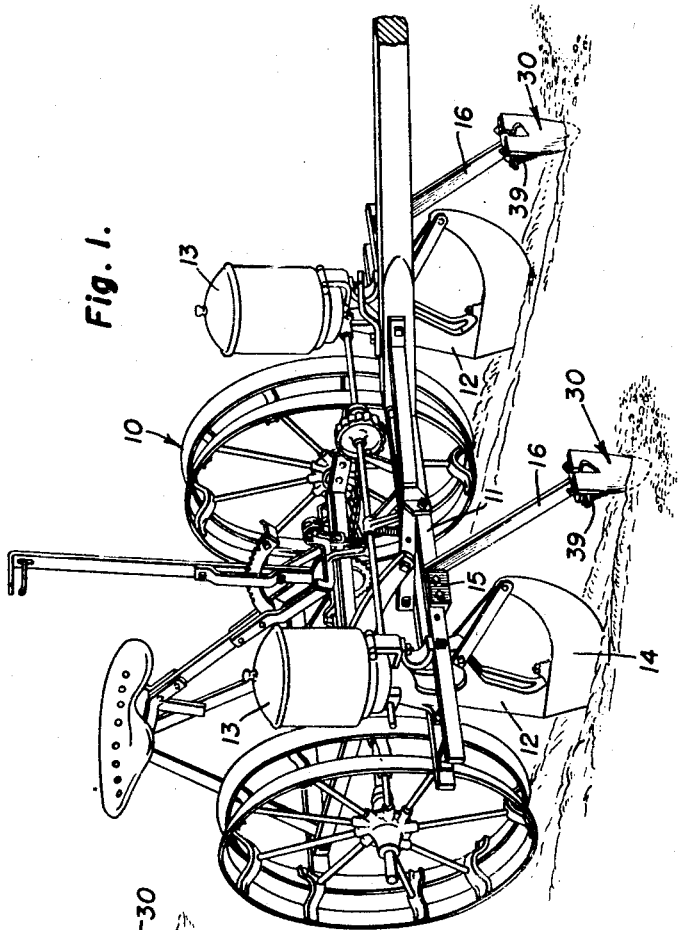
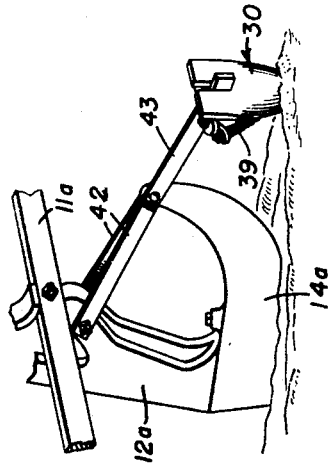
Inventor
Hollis B. Hall
By *Clarence A. O'Brien
and Harvey B. Jackson*
Attorneys

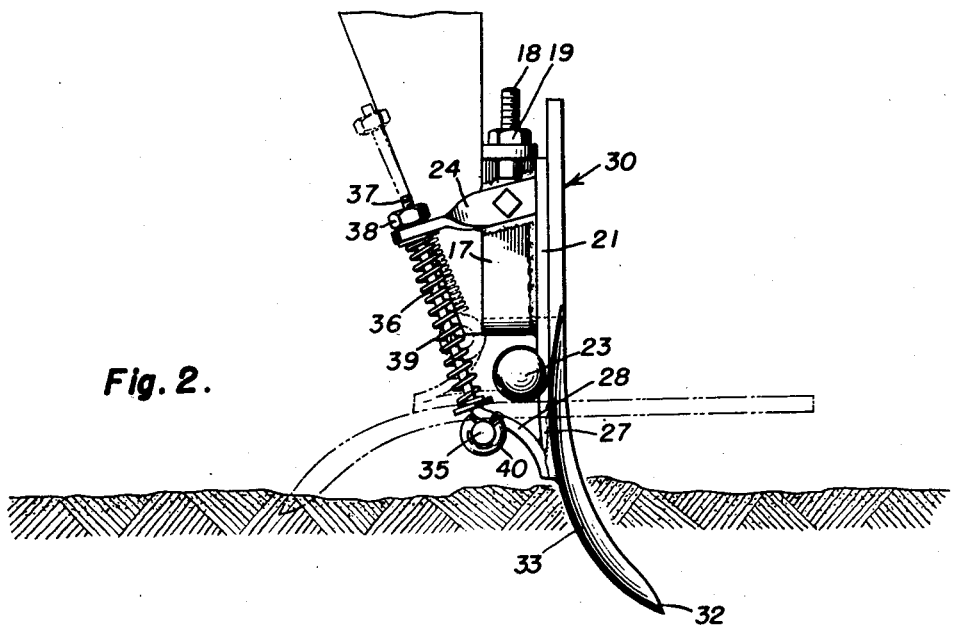
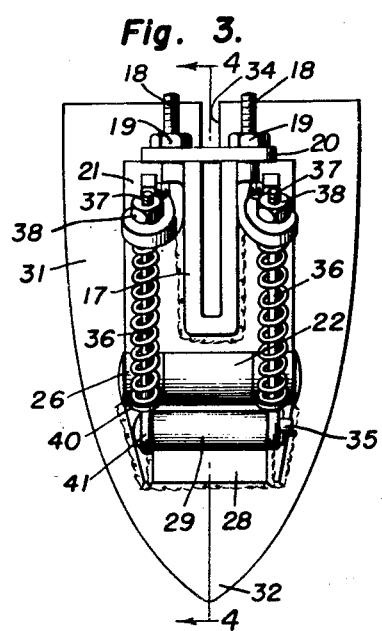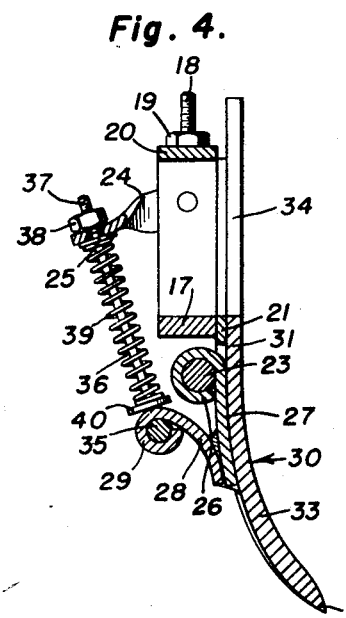

Patented Feb. 28, 1950

2,499,095

UNITED STATES PATENT OFFICE 2,499,095

FURROW OPENING ATTACHMENT FOR GRAIN DRILLS OR PLANTERS

Hollis B. Hall, Mayfield, Ky.

Application April 21, 1947, Serial No. 742,887

1 Claim. (Cl. 97—225)

This invention relates to a furrow opening attachment for a grain drill or planter and has for its primary object to open a furrow in advance of the furrow opener of conventional grain drills.

Another object is to relieve the conventional furrow opener of danger of injury in the planting of grain in soil which has become packed or hardened.

A further object is to avoid injury to the furrow opening blade, through contact with hard objects such as stones, rocks, stumps and roots.

The above and other objects may be attained by employing this invention which embodies among its features a supporting yoke adapted to be coupled to a grain drill in advance of the grain distributing equipment thereof, a furrow opening blade pivoted intermediate its ends to swing about an axis which lies transversely to the direction of movement of the grain drill, and means coupled to the blade and to the yoke, yieldingly to hold the blade in furrow opening position.

In the drawings,

Figure 1 is a perspective view of a grain drill of conventional form showing this improved furrow opening attachment in place thereon, Figure 2 is an enlarged side view in elevation of the furrow opening attachment, Figure 3 is a rear view of the attachment illustrated in Figure 2, Figure 4 is a vertical sectional view taken substantially along the line 4—4 of Figure 3, and Figure 5 is a fragmentary perspective view illustrating an alternate method of mounting the furrow opening attachment on the grain drill.

Referring to the drawings in detail, a grain drill designated generally 10 of conventional form is equipped with a front frame rail 11 supporting adjacent each end a boot 12 surmounted by a hopper 13, and provided at its lower end with a conventional furrow opener 14. The furrow opener 14 may be of the conventional runner type, or may be of any other approved construction commonly employed on grain drills, planters, and the like.

In the preferred form of the invention, the front frame rail 11 has attached thereto in any suitable manner a bracket 15 supporting a downwardly inclined, forwardly extending arm 16 which preferably aligns with a boot 12 and furrow opener 14, as will be readily understood upon reference to the drawings.

Straddling the lower forward end of each arm 16 is a U-shaped yoke 17 carrying, adjacent the upper ends of the legs thereof, a pair of upwardly extending screw-threaded studs 18 for the reception of clamping nuts 19 by which a clamp bar 20 is held in clamping position on the lower end of the arm 16. The yoke 17 is welded to a slotted plate 21 carrying, adjacent its lower end, a pivot barrel 22 for the reception of a pivot pin 23, the purpose of which will be more fully hereinafter explained. Extending downwardly and rearwardly from each arm of the yoke 17 adjacent its upper end is an arm 24 which is provided, adjacent its lower, rear end, with a guide opening 25, the purpose of which will more fully hereinafter appear.

Mounted for rotation about the pivot pin 23 adjacent each end of the barrel 22 is a pivot barrel, 26 which is formed at one end of a supporting plate 27, the opposite end of which has welded, or otherwise attached thereto, a rearwardly and upwardly curving arm 28 terminating in a loop or barrel 29, the purpose of which will be more fully hereinafter explained.

Welded or otherwise attached to the plate 27 on the side opposite the barrel 26 is a furrow opening blade designated generally 30 which comprises a main body portion 31, the side edges of which curve downwardly and converge into an apex or point 32. The body 31 is also curved from a point substantially midway between its ends to the lower pointed end thereof, as at 33, in a direction away from the yoke 17, and entering the upper end edge of the body 31 is a slot 34, the bottom and side edges of which lie coincidental with the inner sides of the yoke 17.

Extending through the barrel 29 is a pivot pin 35, opposite ends of which project slightly beyond the opposite ends of the barrel 29 and pivoted on the projecting ends of the pin 35 are the lower ends of push rods 36, the opposite ends of which extend through the openings 25 in the arms 24 in the manner illustrated in Figure 4. The upper ends of the push rods are threaded, as at 37, and cooperating with the threaded ends thereof are adjusting nuts 38 which are adapted to engage the upper sides of the arms 24 in order to limit the downward movement of the push rods. Surrounding each push rod is a compression coil spring 39, the lower end of each of which bears on a washer 40 surrounding its respective push rod and resting on the loop 41 forming the pivotal connection between the lower end of the push rod and the pivot pin 35. The upper end of the spring 39 bears against the underside of its respective arm 24, and thus the blade 30 is yieldingly urged into contact with the plate 21.

In the modified form of the device illustrated in Figure 5, the boot 12a is supported on the conventional front frame rail 11a and carries, at its lower end, the conventional furrow opener 14a. In this type of construction, one of the bracket arms 42 connecting the forward end of the furrow opener 14a with the boot 12a is extended, as at 43, beyond the forward end of the furrow opener 14a and has mounted thereon this improved furrow opening attachment 30 which functions in the same manner as in Figure 1.

In operation, it will be understood that the furrow opening attachments 30 are attached to the conventional grain drill or planter in the manner illustrated in either Figures 1 or 5, with the clamp bar 20 securely holding the yoke 17 in proper position, and in alignment with the furrow opener 14 or 14a. As the grain drill or planter advances, the pointed end 32 of the blade will open a furrow in the earth, which may be further opened by the furrow opener 14 or 14a and thus the strain on the furrow opener 14 or 14a of the planter or drill is relieved. Should an obstacle, such as a stump, rock, bowlder, or other obstruction be encountered by the lower forward end of the blade 30, it will spring back against the compression of the springs 39, as illustrated in broken lines in Figure 2 so as to avoid injury to its lower sharpened end. The springing of the blade 30 will serve as a signal to the operator of the planter, and its progress may be arrested before injury has occurred to the furrow openers 14 or 14a.

While in the foregoing there has been shown and described the preferred embodiment of this invention, it is to be understood that minor changes in the details of construction, combination and arrangement of parts may be resorted to without departing from the spirit and scope of the invention as claimed.

What I claim as new is:

In a planter of the type having a seed box, a chute leading from the seed box and a shoe projecting forwardly from the lower end of said chute; a furrow opening attachment for said planter comprising an arm carried by the planter, said arm extending forwardly from the planter and terminating in advance of the shoe, a U-shaped yoke detachably mounted in a vertical position on the arm adjacent the forward end thereof, a furrow opening blade pivoted intermediate its ends to the lower end of the yoke, said blade having an elongated longitudinal slot opening through its upper end to accommodate the forward end of the arm, a rearwardly extending bracket arm carried by the blade below its pivotal connection to the yoke, rearwardly extending apertured arms carried by the legs of the yoke adjacent the upper ends thereof, a push rod pivotally supported on the bracket arm adjacent each side thereof, said push rods being slidably received in the apertures in the arms carried by the legs of the yoke and compression coil springs surrounding the push rods between the bracket arm and the apertured arms yieldingly to hold the upper end of the blade against the yoke.

HOLLIS B. HALL.

REFERENCES CITED

The following references are of record in the file of this patent:

UNITED STATES PATENTS

| Number | Name | Date |
|---|---|---|
| 530,844 | Holsclaw | Dec. 11, 1894 |
| 726,423 | Gordon | Apr. 28, 1903 |
| 1,332,577 | Sanders | Mar. 2, 1920 |
| 1,816,131 | Spencer | July 28, 1931 |